United States Patent Office 3,637,629
Patented Jan. 25, 1972

3,637,629
SILVER SALT CATALYSTS FOR PREPARING TRIAZINES AND CROSS-LINKED NITRILE POLYMERS
Edwin Dorfman, Grand Island, N.Y., and William E. Emerson, Barrington, Ill., assignors to Hooker Chemical Corporation, Niagara Falls, N.Y.
No Drawing. Continuation-in-part of application Ser. No. 634,867, May 1, 1967. This application Nov. 12, 1970, Ser. No. 89,107
Int. Cl. C08f 3/74
U.S. Cl. 260—88.7 E
9 Claims

ABSTRACT OF THE DISCLOSURE

This invention relates (A) to a process for producing a triazine by reaction of a perfluoroalkane nitrile in the presence of a catalytic amount of a silver salt, and (B) the cross-linking a polymer or copolymer containing greater than an average of one cyanohaloalkyl group per molecule of the polymer or copolymer, to form a cross-linked polymer or copolymer, in the presence of a silver salt.

REFERENCE TO PRIOR APPLICATION

This is a continuation-in-part of copending application Ser. No. 634,867, filed May 1, 1967, now abandoned.

BACKGROUND OF THE INVENTION

This invention is directed to a novel process for producing triazine compounds. More particularly, the invention relates to a process for producing triazines from an organic nitrile such as either an aromatic or an haloalkane nitrile in the presence of at least a catalytic amount of a novel catalyst.

Prior to this invention, triazines have been produced from nitriles by the employment of a catalytic amount of particular catalysts such as metal oxides or elemental metals, or various combinations of such materials. Although varying degrees of success have been obtained by the employment of such catalysts, because there remain certain problems which have not altogether been overcome, the search for new methods of producing triazines continues. A process directed to the condensation of nitriles employing metal oxide catalysts is disclosed in applicants' copending application Ser. No. 634,848, filed May 1, 1967, and a typical patent employing combinations of ingredients which jointly have a catalytic effect sufficiently to convert a nitrile into a triazine is U.S. Pat. No. 3,095,414.

One of the problems of typical processes for the conversion of a nitrile into a triazine is the conventional requirement of high temperatures. Another problem relates to the need to obtain both a high yield and a high conversion in the production of a triazine from a nitrile.

Accordingly, it is an object of this invention to provide a novel process for the production of triazine or mixtures of triazines from one or more nitriles.

Another object is a process of producing a triazine from a nitrile at a high degree of conversion and at a high degree of yield.

Another object is a process of producing a novel triazine composition.

Another object is a process which employs a novel catalyst whereby a nitrile is trimerized to form a triazine.

Another object is a process which employs a low reaction temperature in the production of a triazine from a nitrile.

Another object is a process for the production of triazines from haloalkane nitriles by the employment of a novel catalyst.

Another object is a process for cross-linking a polymer or copolymer to form a cross-linked polymer or copolymer.

Another object is a novel cross-linked polymer or copolymer composition.

Other objects become apparent from the above and following disclosure.

SUMMARY

The objects of this invention are obtained by a process comprising contacting (A) at least a catalytic amount of silver salt, with (B) a member selected from the group consisting of (1) at least one organic nitrile including mixtures of two or more of said organic nitrile, and (2) at least one polymer or copolymer which contains an average of at least more than one nitrile group per molecule of said polymer or copolymer, including mixtures of two or more of said polymer or copolymer, said contacting being at a temperature and for a time period sufficient to produce, respectively, a composition comprising (1) a triazine composition or (2) a cross-linked polymer or copolymer composition containing said first member.

The preceding paragraph refers to the necessity of an average of at least more than one nitrile group per molecule. This means (1) that at least one polymer or copolymer molecule contains two nitrile groups and (2) that each molecule contains at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also it should be noted that the degree of cross-linking increases with a corresponding increase in the number of nitrile groups per molecule. The optimum number of nitrile groups per molecule therefore, depends upon the properties desired for a particular use. Also, the optimum number of nitrile groups on the molecule depends upon the molecular weight of the polymer or copolymer employed. It should be noted that it is within the scope of this invention to employ polymers or copolymers such as triazine polymers which may be degraded by some means such as by milling, for example, to produce fragments, some of which contain the nitrile groups.

DESCRIPTION OF THE EMBODIMENTS

Typical salts of silver which are within the scope of this invention include chloride, chlorate, iodide, iodate, bromide, bromate, nitrates, nitrites, halides, halogenates, cyanides, cyanates, sulfates, sulfites, and the like, the preferred salts being the halide, the nitrate, the halogenates, and the cyanide of silver. The silver halide salts of this invention are limited to those halides in which the halogen atom has an atomic weight of at least about 35, namely the chlorides, bromides, and the iodides. Silver fluoride is one of the metal fluorides claimed in the copending U.S. Ser. No. 634,893, filed May 1, 1967, the disclosure of which is hereby incorporated by reference.

A novel aspect of this invention resides in the employment of a novel catalyst as defined above. It has unexpectedly been discovered that by the employment of the catalyst of this invention one or more of the above objects are thereby obtained, depending upon the particular catalyst employed. Moreover, it has been discovered unexpectedly that by the employment of certain of the preferred catalysts of this invention, the reaction of our invention will take place at unexpectedly low temperatures. The novel catalyst-containing polymer or copolymer compositions of this invention exhibit novel properties different from corresponding polymers or copolymer compositions produced by other methods. The particular properties depend upon which catalyst of this invention is employed.

The preferred nitrile is a haloalkane nitrile. Within this group is the preferred perhaloalkane nitrile preferably selected from the group consisting of perfluorooctanonitrile, trichloroacetonitrile, 4-bromohexafluorobutyronitrile and mixtures thereof, in which said triazine composition comprises tris(perfluoroheptyl) triazine, tris(trichloromethyl) triazine, tris(3-bromohexafluoropropyl) triazine, and mixtures thereof. The polymer or copolymer preferably is selected from the group consisting of perfluoroalkylene triazine polymers and copolymers, perfluoroalkylene ether polymers, perfluoropropylene-vinylidene fluoride copolymers, fluoroalkyl silicone polymers, tetrafluoroethylene-nitrosotrifluoromethane copolymers, each of which contains at least greater than an average of one cyanoperfluoroalkyl group per molecule, and mixtures thereof.

The novel process of this invention includes the steps of curing a polymer or copolymer in which at least greater than an average of one nitrile group per molecule is a part of a cyanohaloalkyl group, in the presence of the above-described catalyst. The curing is at a sufficiently elevated temperature and a period sufficiently long and in the presence of a sufficient number of polymer cyanohaloalkyl groups to cross-link (vulcanize) to form a cross-linked polymer or a cross-linked copolymer. The process may employ any polymeric composition having at least greater than an average of one cyanohaloalkyl group, per molecule in the presence of a catalytic amount of the catalyst of this invention to cross-link to form a cross-linked polymer or copolymer of this invention. The polymers and copolymers of the novel curing process exhibit novel properties different from what might appear to be corresponding cross-linked polymers and copolymers produced by other methods. The particular properties depend upon which catalyst of this invention is employed. For example, a novel use of the polymer composition of this invention is the employment as a sealant for high temperature use, and it may be cured in situ.

The organic nitrile which may be employed as the beginning reactant in this invention generally includes any conventional organic nitrile such as those disclosed in U.S. Pat. No. 3,095,414 and copending application U.S. Ser. No. 634,848. Accordingly, organic nitriles listed in the above patent such as:

2-methylbenzonitrile;
3-ethylbenzonitrile;
4-butylbenzonitrile;
3-nitrobenzonitrile;
2-ethyl-4-nitrobenzonitrile;
2,4-dimethylbenzonitrile;
2,6-dimethylbenzonitrile;
2-ethyl-3,4,5-trimethylbenzonitrile;
1-naphthonitrile;
2-naphthonitrile;
3-methyl-1-naphthonitrile;
1-cyanoanthracene;
2-cyanoanthracene;
trichloroacetonitrile;
trimethylacetonitrile;
tribromoacetonitrile;
2,2-dichloropropionitrile;
2,2-diiodopropionitrile;
2-iodo-2-methylvaleronitrile;
2,2-difluoro-1-decyl cyanide, and the like may be employed. Similarly, organic nitriles of the above-cited copending application which are typical beginning reactants for this invention include:

perfluorobutyronitrile;
difluoroacetonitrile;
difluorochloroacetonitrile;
perfluoroglutaronitrile;
perfluoroscuccinonitrile;
trifluoroacetonitrile;
pentafluoropropionitrile;
perfluoromalononitrile;
bromotetrafluoropropionitrile;
bromooctafluorovaleronitrile;
nonafluoro-3-thiabutyronitrile;
perfluoroethyladiponitrile;
perfluorosuberonitrile;
perfluorosebaconitrile;
perfluorovaleronitrile;
bromodifluoroacetonitrile;
perfluoroadiponitrile;
perfluorotetradecane dinitrile;
perfluoromethoxypropionitrile;
perfluoroethoxypropionitrile;
perfluorocapronitrile;
3,4-dibromopentafluorobutyronitrile;
trifluoromethylbenzonitrile;
chlorobenzonitrile;
dichlorobenzonitrile;
polychlorobenzonitriles,
perfluorododecane nitrile;
perfluorotetradecane nitrile;
perfluorostearonitrile;
benzonitrile;
2-phenyl-2,4,4,4-tetrafluoroacetoacetonitrile;
perfluorooleonitrile;
m-(trifluoromethylbenzoyl)-benzonitrile;
2-phenyl-2,4,4,4,-tetrafluoroacetoactonitrile;
perfluorobenzonitrile, nitriles of the formula:

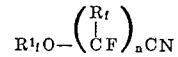

wherein $m$ is one or more, wherein $R^1_f$ is lower perfluoroalkyl and $R_f$ is selected from the group consisting of fluorine and perfluoroalkyl of from 1 to 12 carbons atoms, such as:

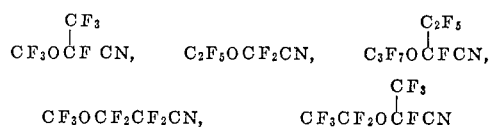

and the like; nitriles of the formula:

$$T(R''_f)$$
$$O(CF_2)_nCN$$

wherein T is selected from the group consisting of hydrogen and halogen $R''_f$ is prefluoroalkylene of 1 to 12 carbon atoms, and $n$ is from 1 to 10, such as:

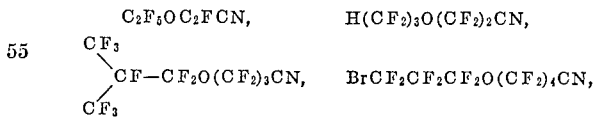

perfluoroisobutyloxypropionitrile, perfluorohexyloxypropionitrile, perfluorooctyloxypropionitrile, and the like; and mixtures of the aforementioned nitriles. It is to be understood that the above-listed organic nitriles are not all inclusive, but are merely intended to illustrate some of the compounds which are contemplated for purposes of this invention.

As noted above, the haloalkane nitriles are the preferred reactants for this invention. These nitriles are characteristically trimerized at 190 degrees centigrade or less, in twenty or less hours. Within this group, preferred embodiments are those haloalkane nitriles having at least one fluorosubstituent, and secondly, those haloalkane nitriles having at least two halo substituents. A third preferred embodiment is haloalkane nitrile which contains at least two fluoro substituents. Typical examples of these various preferred embodiments include perfluorobutyronitrile, perfluorosuberonitrile, perfluorosebaconitrile, perfluorovaleronitrile, perfluorotetradecane dinitrile, perfluoroethoxypropionitrile, difluoroacetonitrile, trifluoroacetonitrile, pentafluoropropionitrile, bromotetrafluoropropionitrile, bromooctafluorovaleronitrile, monofluoro-3-thiabutyronitrile, monofluoroacetonitrile, trichloroacetonitrile, and the like.

In order to bring about the trimerization reaction, it is merely necessary that the amount of catalyst be sufficient, based on percentage by weight of the nitrile employed to initiate and maintain a trimerization reaction. Except for practical purposes, there is no known maximum amount. However, because the catalyst normally would have to be removed from the reaction product, i.e., separated therefrom, it normally would be desirable to employ as little catalyst as necessary to accomplish the desired result. There would rarely be any need to employ higher than 10 percent of catalyst, based on the weight of the nitrile employed. The minimum amount of catalyst found to be normally necessary is at least about 0.01 percent by weight. The preferred percentage range is from about 0.05 percent to about 10 percent by weight.

The nitrile trimerization reaction can be run in any solvent which does not adversely react with the nitrile, the catalyst, or the reaction products of the nitrile and catalyst. Suitable solvents include, e.g., n-butyl acetate, carbon tetrachloride, ortho-chlorotoluene, chlorobenzene, nitrobenzene, cyclohexanone, ortho-dichlorobenzene, diethylcarbitol, dimethylsulfoxide, dioxane, ethyl acetate, and the like. This list is merely illustrative, and does not purport to describe the vast number of solvents which can be used in the process of this invention. Similarly, such solvents may be employed with the polymer or copolymer composition (mixture) of this invention, for uses such as paints, sealants, and coatings.

The process of this invention is normally operable at a temperature of from zero to about 400 degrees centigrade, though it is preferably practiced in the zero degree centigrade to about 250 degree centigrade range depending upon the particular catalyst employed, more preferably above about 15 degrees centigrade, including a preferred trimerization temperature of from about 100 degrees centigrade to about 200 degrees centigrade, and including a curing temperature up to preferably about 190 degrees centigrade for the polymer or copolymer. Although it is normally desirable that the temperature employed be near room temperature if a good yield and conversion can be obtained, it is solely by the employment of particular preferred embodiments of this invention that it is possible to produce satisfactory yields at this low temperature for example.

The reaction time is typically dependent on several factors such as the particular catalyst employed, the amount of catalyst employed, the temperature at which the reaction is carried out, and the degree of conversion desired, for example. A reaction time of from about two hours up to about seven days is normally satisfactory.

The degree of cross-linking for polymers and copolymers of this invention has been found to depend on the number of cyanohalo alkyl groups along the polymer chain, the amount of catalyst used, and on the time and the temperature range which is used in the curing process of the polymer. The polymers which have been cross-linked by this method have been perfluoroalkylene triazine polymers of a wide range of molecular weight.

Lower molecular weight perfluoroalkylene triazine polymers which have nitrile groups only at the polymer chain ends have been cured catalytically. Perfluoroalkylene triazine polymers which have cyanoperfluoroalkyl groups at the 6 position of the triazine ring have also been successfully cured. The percentage of cyanoperfluoroalkyl groups at the 6 position of the triazine ring on these polymer chains may vary from less than 1 percent up to 100 percent. A preferred percentage is from about 3 percent to 20 percent of nitrile-containing groups in the 6 position of the triazine ring. Perfluoroalkylene triazine polymers have been described in our copending application U.S. Ser. No. 533,430, filed Mar. 11, 1966, which disclosure is hereby incorporated by reference.

Other fluorine-containing polymers such as the tetrafluoroethylene - trifluoronitrosomethane copolymers can also be cured by these catalytic curing processes provided they contain the nitrile groups as set forth hereinabove. Perfluoroalkylene ether polymers, perfluoropropylenevinylidene fluoride copolymers, fluoroalkyl silicone polymers and the like containing the disclosed nitrile groups, also can be cured by this catalyst.

The triazine and cross-linked polymer or copolymer products produced by this invention are typically useful in applications requiring high-temperature stability and chemical stability. The specific triazines produced by this invention are useful both as high temperature lubricants and solvents, whereas the polymer or copolymer produced when a dinitrile is condensed is useful in preparing highly heat-resistant molded articles.

The following examples are not intended to limit the invention disclosed, but rather to illustrate it. All percentages are based on percent of theory unless otherwise stated, all parts are by weight and temperatures are given in degrees centigrade unless indicated otherwise.

EXAMPLE 1

Perfluorooctanonitrile, 3.74 grams, and silver cyanide, 0.134 gram, were sealed in a Carius tube under nitrogen and heated at about 190 degrees centigrade for about 22.5 hours. The product, analyzed by infrared absorption spectroscopy contained 3.2 percent of tris(perfluoroheptyl)triazine and 97 percent of perfluorooctanonitrile.

EXAMPLE 2

By a procedure similar to Example 1, perfluorooctanonitrile, 4.0 grams, and silver iodide, 0.235 gram, were heated at about 190 degrees centigrade in a Carius tube for about 20 hours under nitrogen. This gave 0.4 percent conversion to tris(perfluoroheptyl)triazine by infrared analysis.

EXAMPLE 3

By a procedure similar to Example 1, perfluorooctanonitrile, 4.05 grams of silver iodate, 0.292 gram were heated at about 190 degrees centigrade for about 20 hours. This gave 0.24 percent conversion to tris(perfluoroheptyl)triazine by infrared analysis.

EXAMPLE 4

By a procedure similar to Example 1, perfluorooctanonitrile, 3.72 grams and silver nitrate, 0.160 gram, were heated at about 190 degrees centigrade for about 18 hours. This gave 0.5 percent conversion to tris(perfluoroheptyl)triazine by infrared analysis.

EXAMPLE 5

By a procedure similar to Example 1, perfluorooctanonitrile ($C_7F_{15}CN$), 4.16 grams, and silver chloride, 0.151 gram were heated to about 190 degrees centigrade for about 18 hours gave 0.2 percent conversion to triazine by infrared analysis.

EXAMPLE 6

By a procedure similar to Example 5, except that 3.56 grams of the perfluorooctanonitrile and 0.068 gram of silver cyanate were employed, and after 20 hours at 190 degrees centigrade, a 69 percent conversion was obtained.

EXAMPLES 7–12

A perfluoroalkylenetriazine polymer containing from one to 20 cyanoperfluoropropyl groups for every 99 to 80 perfluoropropyl groups respectively in the polymer chain is mixed with 5 percent by weight of catalyst (1 gram polymer per 0.05 gram catalyst) as shown in the following table. The mixtures are then heated at the temperatures shown and for the periods of time indicated to produce cross-linked polymers as indicated by the fact the resulting products are insoluble in hexafluoroxylene.

| Example No. | Catalyst | Temp. (° C.) | Time (hours) |
|---|---|---|---|
| 7 | Silver chloride | 190 | 20 |
| 8 | Silver nitrate | 190 | 20 |
| 9 | Silver iodate | 190 | 20 |
| 10 | Silver iodide | 190 | 20 |
| 11 | Silver cyanide | 190 | 20 |
| 12 | Silver cyanate | 190 | 20 |

It is to be understood that the specification, including the examples, are only illustrative of the invention claimed herein, and that it is within the scope of this invention to employ equivalents obvious to one skilled in the art.

We claim:

1. A process for preparing a cross-linked polymer or copolymer composition which comprises reacting at least one perfluoroalkylene triazine polymer or copolymer which contains at least one polymer or copolymer molecule containing two nitrile groups and wherein each molecule contains at least one nitrile group, in the presence of a catalytic amount of a silver salt selected from the group consisting of halide wherein the halogen has an atomic weight of at least about 35, halogenate, nitrate, nitrite, cyanate, cyanide, sulfate, sulfide and mixtures thereof, at a reaction temperature of about 0 to 400 degrees centigrade.

2. The process of claim 1 wherein the reaction temperature is from about 25 to about 190 degrees centigrade and wherein each nitrile group is part of a cyanohaloalkyl group.

3. The process according to claim 2 wherein the alkylene groups of the cyanohaloalkyl groups are each selected from the group consisting of methylene, ethylene, propylene, butylene, pentylene, hexylene, heptylene, octylene, nonylene and decylene.

4. A process according to claim 3 in which said silver salt comprises silver chloride.

5. A process according to claim 3 in which said silver salt comprises silver nitrate.

6. A process according to claim 3 in which said silver salt comprises silver iodate.

7. A process according to claim 3 in which said silver salt comprises silver iodide.

8. A process according to claim 3 in which said silver salt comprises silver cyanide.

9. A process according to claim 3 in which said silver salt comprises silver cyanate.

References Cited
UNITED STATES PATENTS

| 3,060,179 | 10/1962 | Toland | 260—248 |
| 3,369,002 | 2/1968 | Griffin | 260—78.4 |
| 3,470,176 | 9/1969 | Zollenger | 260—248 |
| 3,542,660 | 11/1970 | Gundall | 260—248 X |

MORRIS LIEBMAN, Primary Examiner

R. ZAITLEN, Assistant Examiner

U.S. Cl. X.R.

252—441; 260—2 M, 37 N, 248 CS